United States Patent [19]
Mennie et al.

[11] Patent Number: 5,806,650
[45] Date of Patent: Sep. 15, 1998

[54] CURRENCY DISCRIMINATOR HAVING A JAM DETECTION AND CLEARING MECHANISM AND METHOD OF CLEARING A JAM

[75] Inventors: Douglas U. Mennie, Barrington; Bradford T. Graves, Arlington Heights, both of Ill.

[73] Assignee: Cummins-Allison Corp., Mt. Prospect, Ill.

[21] Appl. No.: 522,173

[22] Filed: Aug. 31, 1995

Related U.S. Application Data

[63] Continuation-in-part of Ser. No. 340,031, Nov. 14, 1994.
[51] Int. Cl.⁶ .............................. G07D 7/00; B07C 5/00; B65H 7/02
[52] U.S. Cl. ................... 194/206; 194/345; 271/258.01; 271/902; 271/272; 271/184; 209/534
[58] Field of Search ................... 271/258.01, 258.03, 271/259, 265.01, 272–274, 902, 184; 209/534; 194/260, 345

[56] References Cited

U.S. PATENT DOCUMENTS

| D. 369,984 | 5/1996 | Larsen | D10/97 |
|---|---|---|---|
| 1,291,074 | 1/1919 | Milmoe et al. | 271/119 |
| 1,919,238 | 7/1933 | McCarthy | 271/119 |
| 2,214,752 | 9/1940 | Pierce | 271/122 |
| 3,044,770 | 7/1962 | Breuers | 271/122 |
| 3,656,615 | 4/1972 | Ptacek | 209/534 |
| 3,771,783 | 11/1973 | McInerny | 271/125 |
| 4,025,420 | 5/1977 | Horino | 209/74 R |
| 4,250,806 | 2/1981 | Boyson et al. | 101/2 |
| 4,443,006 | 4/1984 | Hasegawa | 271/119 X |
| 4,653,647 | 3/1987 | Hashimoto | 209/534 |
| 4,677,682 | 6/1987 | Miyagawa et al. | 382/7 |
| 4,709,911 | 12/1987 | Saiki et al. | 271/122 X |
| 4,715,597 | 12/1987 | Sakurai | 271/122 |
| 4,772,781 | 9/1988 | Watanabe | 235/379 |
| 4,784,274 | 11/1988 | Mori et al. | 209/534 |
| 4,801,134 | 1/1989 | Yokoyama et al. | 271/122 |
| 4,861,013 | 8/1989 | Shibata et al. | 271/122 X |
| 4,869,490 | 9/1989 | Reid | 271/122 |
| 4,878,087 | 10/1989 | Sakai et al. | 271/902 X |

(List continued on next page.)

FOREIGN PATENT DOCUMENTS

| 29 08 058 A1 | 9/1979 | Germany | 271/119 |
|---|---|---|---|
| 63-282032 | 11/1988 | Japan | 271/119 |
| 300048 | 12/1988 | Japan | 271/258.03 |
| 1-177188 | 7/1989 | Japan | 271/119 |
| 2-198929 | 8/1990 | Japan | 271/119 |
| WO 90/07165 | 6/1990 | WIPO . | |
| WO 92/17394 | 10/1992 | WIPO . | |
| WO 94/16412 | 7/1994 | WIPO | G07D 7/00 |
| WO 94/19773 | 9/1994 | WIPO . | |
| WO 95/24691 | 9/1995 | WIPO . | |
| WO 96/10800 | 4/1996 | WIPO . | |

OTHER PUBLICATIONS

Chp. 7 of Mosler CF–420 Cash Management System, Operator's Manual©, 1989.

Drawings of Portions of Mosler CF–420 Cash Management System (FIGS. A–C) and Description of the Same (1989).

*Primary Examiner*—Boris Milef
*Attorney, Agent, or Firm*—Arnold, White & Durkee

[57] ABSTRACT

A currency counting and discrimination machine for rapidly counting and discriminating currency bills is set forth having a jam detection and clearing mechanism. The machine has a transport mechanism which engages and transports the currency bills, one at a time, along a transport path from an input receptacle to an output receptacle. A sensing device for scanning and counting the currency bills is adjacent a segment of the transport path. Several sensors along the transport path detect when a currency bill becomes jammed. Once a jammed currency bill is detected, the operation of the transport mechanism is interrupted. A portion of the transport mechanism is then adjusted to relieve pressure exerted on the jammed currency bill by the transport mechanism. The transport mechanism is then reactivated to remove the jammed currency bill from the transport path.

30 Claims, 11 Drawing Sheets

U.S. PATENT DOCUMENTS

| | | | |
|---|---|---|---|
| 4,880,096 | 11/1989 | Kobayashi et al. | 209/534 |
| 4,964,517 | 10/1990 | Nishiumi et al. | 209/534 |
| 5,011,129 | 4/1991 | Holbrook | 271/273 X |
| 5,055,834 | 10/1991 | Chiba | 382/135 |
| 5,163,672 | 11/1992 | Mennie | 271/187 |
| 5,167,411 | 12/1992 | Isobe | 271/273 |
| 5,203,217 | 4/1993 | Buckley | 271/273 X |
| 5,207,788 | 5/1993 | Geib et al. | 271/122 |
| 5,261,652 | 11/1993 | Kubo | 271/119 |
| 5,295,196 | 3/1994 | Raterman et al. | |
| 5,341,408 | 8/1994 | Melcher et al. | 377/8 |
| 5,377,805 | 1/1995 | Ono et al. | 271/258.01 |
| 5,430,664 | 7/1995 | Cargill et al. | 364/550 |
| 5,437,357 | 8/1995 | Ota et al. | 382/135 |
| 5,467,405 | 11/1995 | Raterman et al. | 382/135 |
| 5,633,949 | 5/1997 | Graves et al. | 382/135 |
| 5,687,963 | 11/1997 | Mennie | 271/119 |

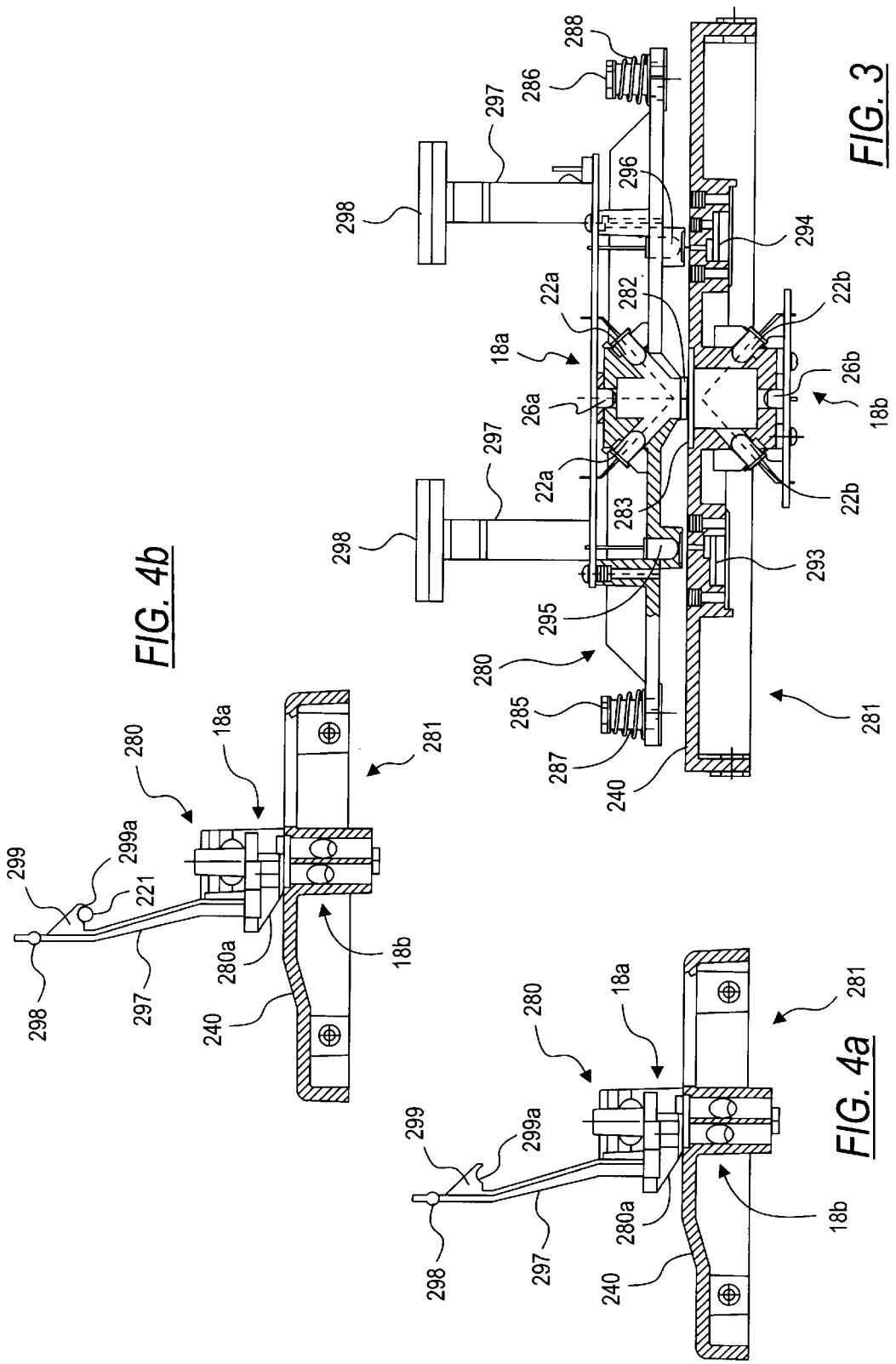

CURRENCY DISCRIMINATOR HAVING A JAM DETECTION AND CLEARING MECHANISM AND METHOD OF CLEARING A JAM

This application is a continuation-in-part of application Ser. No. 08/340,031, filed Nov. 14, 1994, entitled "Method and Apparatus for Discriminating and Counting Documents."

FIELD OF THE INVENTION

The present invention relates, in general, to document discrimination and counting. More specifically, the present invention relates to a mechanism and method for detecting and clearing a jam from a machine which discriminates and counts currency bills.

BACKGROUND OF THE INVENTION

For a currency scanning and discriminating machine to operate, currency bills are conveyed by a transport mechanism along a transport path from an input receptacle, past a sensing device, and to an output receptacle. In normal operation, a controller monitors the signals received from the sensing device and determines the denomination of each currency bill that is scanned. However, a bill or bills can become jammed in the transport path, especially near the sensing device. Any jamming results in the machine being nonoperational. Thus, it is desirable to detect and clear the jammed currency bills in a simplistic and timely manner.

SUMMARY OF THE INVENTION

Briefly, the present invention is a medium for detection and clearing of a jam in a currency scanning and discriminating machine. The jam detection and clearing mechanism advantageously minimizes the efforts required by the machine operator and, therefore, reduces the time required to clear the jam. Furthermore, by minimizing the efforts of the operator, the likelihood the operator will become injured is lessened as is the probability the operator will damage the sensing device adjacent the transport path.

In accordance with the present invention, if a bill becomes jammed during normal operation, a controller within the machine detects the jam through at least one of several methods. The controller may monitor the time required for a currency bill to pass by two sets of optical sensors which perform different functions. Additionally, the controller may monitor the speed of the transport mechanism to detect whether the speed is significantly less than the normal operational speed. Once a jam is detected, the controller interrupts the driving of the transport mechanism.

The invention then provides for various manual and automatic devices which relieve the pressure exerted on the jammed bill by the transport mechanism. The operator then can activate the transport mechanism in a reverse or forward direction to remove the jammed currency bill. The transport mechanism is then returned to its operational position, and the currency scanning and discriminating machine is ready to be operated.

The above summary of the present invention is not intended to represent each embodiment, or every aspect of the present invention. This is the purpose of the figures and detailed description which follow.

BRIEF DESCRIPTION OF THE DRAWINGS

FIG. 3 is a section view of the sensing device;

FIG. 4a is a section view of the lower member of the sensing device and an end elevation of the upper member of the sensing device;

FIG. 4b is a section view of the lower member of the sensing device and an end elevation of the upper member of the sensing device in which the handles are latched onto a shaft;

DETAILED DESCRIPTION OF THE PREFERRED EMBODIMENTS

Figure 1:
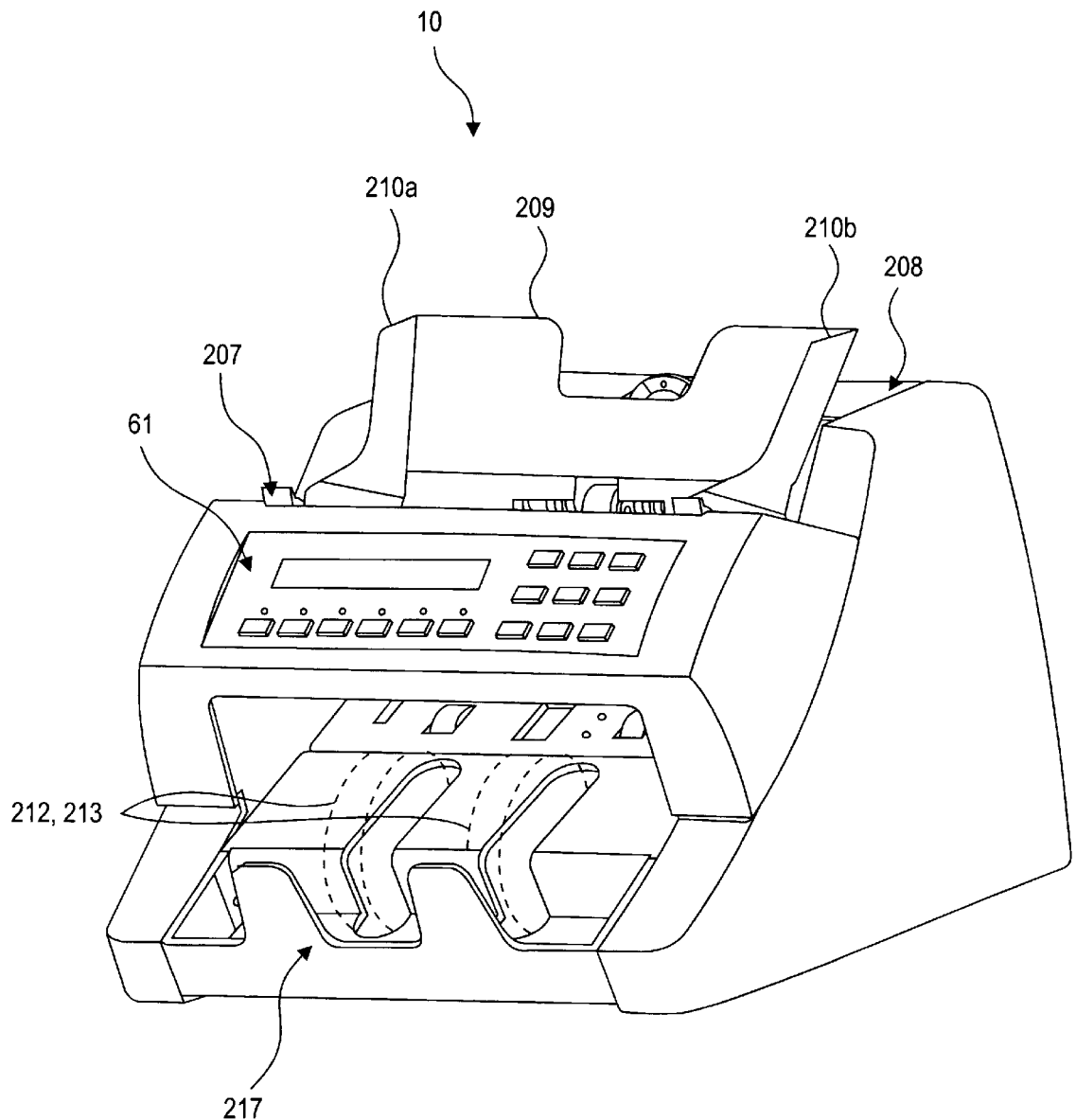
FIG. 1 is a perspective view of a currency scanning and counting machine embodying the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

Figure 2:
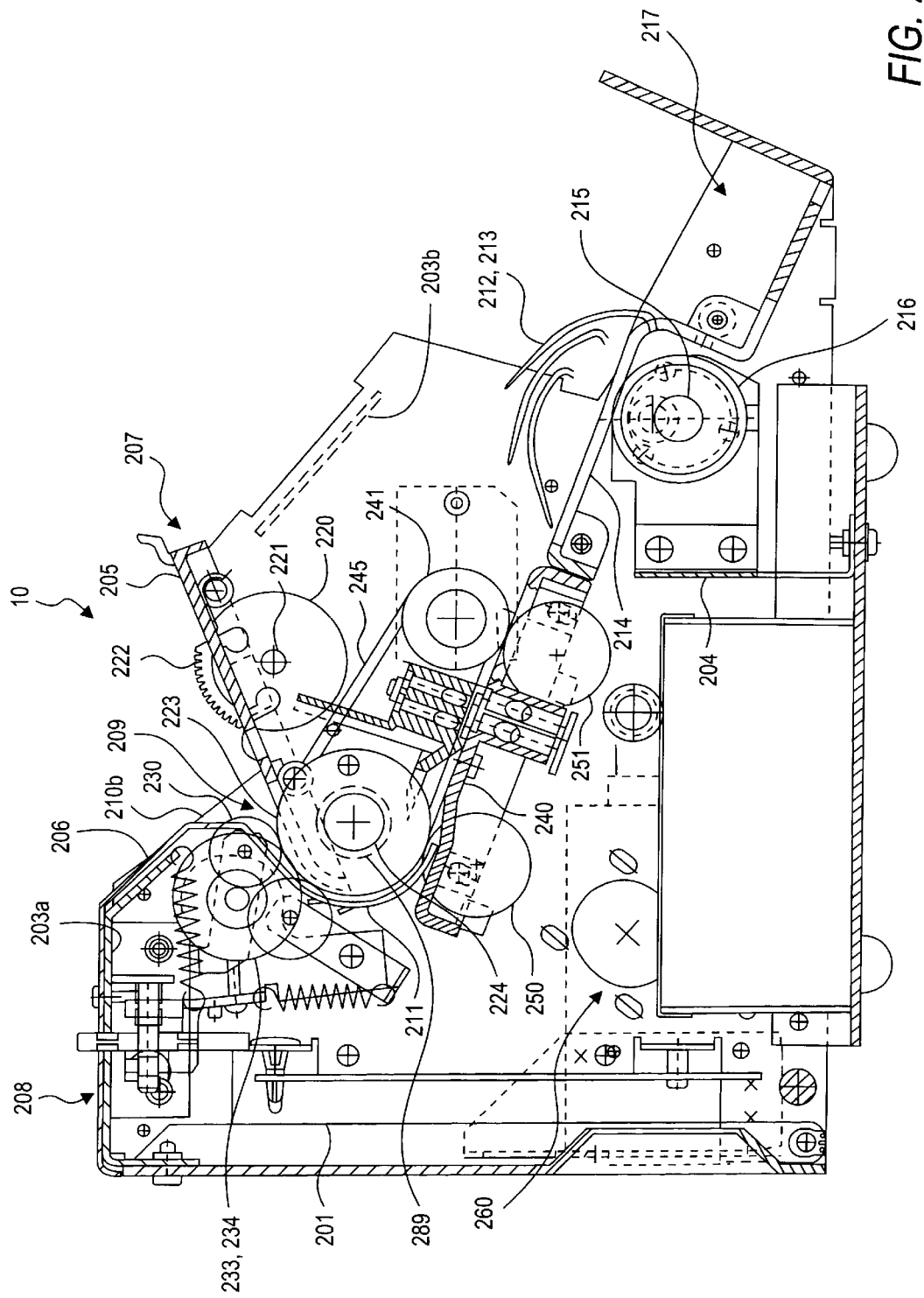
FIG. 2 is a vertical sectional view approximately through the center of the machine of FIG. 1 which illustrates the transport rolls and mechanisms in a side elevation.

The operation of the currency scanning and counting machine 10 of FIGS. 1 and 2 is described in more detail in co-pending U.S. patent application Ser. No. 08/340,031, filed on Nov. 14, 1994 and entitled "Method and Apparatus for Discriminating and Counting Documents," which is incorporated herein by reference in its entirety. Such a discrimination system may process bills at speeds on the order of 800 to 1500 bills per minute. Other examples of currency discrimination and processing devices which may be used in conjunction with the jam clearing mechanism and method of the present invention are described in detail in U.S. Pat. No. 5,295,196 which is incorporated herein by reference in its entirety.

Referring now to FIG. 1, there is shown an embodiment of a currency scanning and counting machine 10 that may employ the jam detection and clearing mechanism according to the present invention. The machine 10 includes an input receptacle or bill input hopper 209 where stacks of currency bills that need to be identified and counted are positioned. Bills in the input hopper 209 are acted upon by a bill separating station which functions to pick out or separate one bill at a time. Each bill is sequentially relayed by a bill transport mechanism along a precisely predetermined transport path, past a sensing device where the currency denomination of the bill is scanned and identified. In the embodiment depicted, the sensor is a pair of optical scanheads that scan for characteristic information from a scanned bill which is used to identify the denomination of the bill. The scanned bill is then transported to an output receptacle 217 where bills are stacked for subsequent removal. As seen in FIG. 1, the output receptacle 217 comprises stacker wheels 212, 213 which project upwardly through a pair of openings in a stacker plate 214 to receive the bills as they are advanced across the downwardly sloping upper surface of the stacker plate 214. The stacker wheels 212 and 213 are supported for rotational movement about a shaft 215 journalled on the rigid frame and driven by a stacker motor 216.

According to one embodiment of the currency scanning and counting machine 10, a number of selection elements associated with individual denominations are provided. In FIG. 1, these selection elements are in the form of keys or buttons of a keypad on a control panel 61. Other types of selection elements such as switches or displayed keys in a touch-screen environment may be employed. The control panel 61 comprises a keypad 62 and a display 63 which are shown in detail in FIG. 9. The keypad 62 comprises a plurality of keys including denomination selection elements associated with different currency denominations, e.g., $1, $2, $5, $10, $20, $50, and $100. The keypad also comprises a continuation selection element and a mode selection element. Various information such as instructions, mode selection information, authentication and discrimination information, individual denomination counter values, and total batch counter value are communicated to the operator via the display 63 which can be an LCD.

Referring now to FIG. 2, the mechanical portions of the preferred currency scanning and counting machine 10 include a rigid frame formed by a pair of side plates 201 (only one shown), a pair of top plates 203a and 203b, and a lower front plate 204. The input receptacle region for receiving a stack of bills to be processed is formed by downwardly sloping and converging walls 205 and 206 which are parts of removable covers 207 and 208, respectively, that snap onto the frame. The rear wall 206 supports the removable input hopper 209 which includes a pair of vertically disposed side walls 210a and 210b (both shown in FIG. 1).

To initiate the scanning process, currency bills are stacked on the bottom wall 205 and are stripped, one at a time, from the bottom of the stack. The bills are stripped by a pair of auxiliary feed wheels 220 mounted on a drive shaft 221 which, in turn, is supported across the side walls 201. The auxiliary feed wheels 220 project through a pair of slots formed in the cover 207. Each auxiliary feed wheel 220 includes a raised high-friction, serrated surface 222 around a portion of the periphery which engages the bottom bill of the input stack as the auxiliary feed wheels 220 rotate to initiate the movement of the bottom bill from the stack. The serrated surface 222 projects radially beyond the rest of the wheel periphery so that the wheels "jog" the bill stack during each revolution so as to loosen the bottom currency bill within the stack and the bottom bill from the stack. The auxiliary feed wheels 220 move each stripped bill onto a drive roll 223 mounted on a driven shaft 224 supported across the side walls 201.

To ensure firm engagement between the drive roll 223 and the currency bill being fed, an idler roll 230 urges each incoming bill against a smooth central surface of the drive roll 223. The idler roll 230 is journalled on a pair of arms which are pivotally mounted on a support shaft. A pair of stripping wheels 233 and 234 are also mounted on the shaft 232 on opposite sides of the idler roll 230. The grooves in these two stripping wheels 233, 234 are registered with the central ribs in the two grooved surfaces of the drive roll 223. Although the idler roll 230 and the stripping wheels 233, 234 are mounted behind the guideway 211, the guideway 211 is apertured to allow the idler roll 230 and the stripping wheels 233, 234 to engage the bills on the front side of the guideway 211.

To prepare the bills for scanning, the bills transported by the drive roll 223 engage a flat guide plate 240 on which a sensing device is mounted at the lower end of the curved guideway 211. Currency bills are positively driven along the flat plate 240 by means of a transport roll arrangement which includes the drive roll 223 at one end of the flat plate 240 and a smaller drive roll 241 at the other end of the plate. Both the drive roll 223 and the smaller drive roll 241 include pairs of smooth raised cylindrical surfaces which hold the bill flat against the plate 240. A transport motor 260 drives both drive roll 223 and smaller drive roll 241 through a series of belts and pulleys. Additionally, the auxiliary feed wheels 220 are driven by the transport motor 260 via a pulley or belt attached on drive roll 223. A pair of O rings 245 (only one shown) fit into grooves formed in both the smaller drive roll 241 and the drive roll 223 to continuously engage the bill between the two rolls 223 and 241 and transport the bill while holding it flat against the guide plate 240.

The flat guide plate 240 is provided with openings through which the raised surfaces of both the drive roll 223 and the smaller driven roll 241 are subjected to counter-rotating contact with corresponding pairs of passive transport rolls 250 and 251 having high-friction rubber surfaces. The passive rolls 250, 251 are mounted on the underside of the flat plate 240 in such a manner as to be freewheeling about their axes and biased into counter-rotating contact with their corresponding drive rolls 223, 241. The passive rolls 250, 251 are biased into contact with their corresponding drive rolls 223 and 241 by means of a pair of leaf springs 252, 253 (shown in FIG. 6).

The points of contact between the drive rolls 223, 241 and passive rolls 250, 251 are preferably coplanar with the level surface of the flat plate 240 so that currency bills can be positively driven along the upper surface of the flat plate 240 in a smooth, flat manner. The distance between the axes of the two drive rolls 223 and 241 is selected to be just short of the length of the narrow dimension of the currency bills. Accordingly, the bills are firmly gripped under uniform pressure between both pairs of transport rolls, thereby minimizing the possibility of bills being skewed or twisted which enhances the reliability of the overall scanning process.

The sensing device which includes a pair of scanheads 18a and 18b is shown in detail in FIGS. 3, 4a, and 4b. It can be seen that the housing for each scanhead 18a and 18b is formed as an integral part of a unitary molded plastic support member 280 and 281. The lower member 281 forms the flat plate 240 that receives the bills from the drive roll 223 and supports the bills as they are driven past the scanheads 18a and 18b.

Each of the two optical scanheads 18a and 18b housed in the support members 280, 281 includes a pair of light sources acting in combination to uniformly illuminate strips of a desired dimension on opposite sides of a bill as it is transported across the flat guide plate 240. Thus, the upper scanhead 18a includes a pair of LEDs 22a directing light downwardly through an optical mask on top of a lens 282 onto a bill traversing the flat guide plate 240 beneath the scanhead 18a. Both LEDs 22a are angularly disposed relative to the vertical axis of the upper scanhead 18a so that their respective light beams combine to illuminate the desired light strip defined by an aperture in the mask. The scanhead 18a also includes a photodetector 26a mounted directly over the center of the illuminated strip for sensing the light reflected off the strip. The photodetector 26a is linked to a CPU 30 (See FIG. 8) through an analog-to-digital convertor (ADC) for processing the sensed data. Similarly, the lower scanhead 18b which includes a pair of LEDs 22b, a lens 283, and a photodetector 26b communicates with the CPU 30 through an ADC. The manner in which this data is processed is explained in detail in U.S. patent application Ser. No. 08/340,031 which has been incorporated by reference.

The upper member 280 and lower member 281 are mounted facing each other so that the lenses 282 and 283 of the two scanheads 18a, 18b define a narrow gap through which each bill is transported. Generally, the gap is approximately 0.025 inch when the machine is in the operational mode. The upper support member 280 includes a tapered entry guide 280a which guides an incoming bill into the gap between the opposed lenses 282 and 283.

Doubling or overlapping of bills in the illustrative transport mechanism is detected by two additional photosensors which are located on a common transverse axis that is perpendicular to the direction of bill flow. The photosensors include photodetectors 293 and 294 mounted within the lower member 281 in immediate opposition to corresponding light sources 295 and 296 mounted in the upper member 280. The photodetectors 293, 294 detect beams of light directed downwardly onto the bill transport path from the light sources 295, 296 and generate analog outputs which correspond to the sensed light passing through the bill. Each such output is converted into a digital signal by a conventional ADC unit whose output is input to, and processed by, the CPU 30.

The presence of a bill adjacent the photosensors causes a change in the intensity of the detected light, and the corresponding changes in the analog outputs of the photodetectors 293 and 294 serve as a convenient means for density-based measurements for detecting the presence of "doubles" (two or more overlaid or overlapped bills) during the currency scanning process. For instance, the photodetectors 293, 294 may be used to collect a predefined number of density measurements on a test bill, and the average density value for a bill may be compared to predetermined density thresholds (based, for instance, on standardized density readings for master bills) to determine the presence of overlaid bills or doubles. Thus, this density detecting system ensures that no more than one bill is being scanned at a time.

Although the machine has been designed to greatly minimize the jamming of currency bills while being moved along the transport path, situations arise in which the machine will become jammed, especially in the area of the scanheads 18a, 18b. For example, an older currency bill which is not as "crisp" as a newer bill tends to buckle when its leading edge engages the guiding members within the transport path, especially in the region adjacent the sensing devices. As it begins to obstruct the transport path, the buckled bill in the transport path loses its velocity. The bills trailing the buckled bill then come into contact with the buckled bill and cause the transport path to become jammed. Additionally, currency bills with bent corners or a bill in the stack that is folded can catch on edges along the transport path as well. In any event, it is useful to have a simple means in which to clear a jam that may occur, especially beneath the upper member 280.

The lower member 281 is attached rigidly to the machine frame. However, the upper member 280 is slidably mounted on a pair of posts 285 and 286 on the machine frame thereby providing limited vertical movement. A pair of springs 287 and 288 bias the upper member 280 to its lowermost position in the operational mode. In one embodiment, a pair of handles 297 connected to upper member 280 are exposed once an access cover is opened. For example, removing the removable hopper 209 exposes the handles 297. Once exposed, the operator lifts the handles 297 by their gripping portion 298 and moves the connecting portion 299 over a structure rigidly affixed to the frame. An engagement surface 299a then engages the rigid structure to support the upper member 280. In FIG. 4b, the engagement surface 299a of each handle 297 is semi-circular and the structure to which it is connected is the shaft 221 which is also shown in FIG. 2. When positioned in this retracted position, the gap between the lenses 282 and 283 of the two scanheads 18a, 18b increases and is in the range from about 0.075 inch to about 0.20 inch.

Generally, the handles 297 are flexible to allow them to be deflected in a direction parallel to the direction a currency bill moves along the transport path. Thus, when attaching the handles 297 to and detaching them from the shaft 221 in FIGS. 4a and 4b, the operator can move the connecting portion 299 laterally across the shaft 221.

Alternatively, the upper member 280 can be locked into the retracted position by a brace member which engages the posts 285, 286. Small handles connected to the upper member 280 near the posts 285, 286 are grasped to lift the upper member 280. When in the retracted position, the rigid brace member attached to the frame or handles is positioned between the posts 285, 286 and a portion of the handles which acts against the springs 287, 288 and restrains the upper member 280 from returning to the operational position. In another alternative, small handles having a profile similar to the handle 297 in FIGS. 4a and 4b could latch onto rigid structures attached to the frame near the posts 285, 286.

In yet another alternative, the upper member 280 is separated from the lower member 281 without removing any access cover like the removable hopper 209. The operator moves a lever which is connected to one of the members 280, 281 and is exposed on the exterior of the machine. The movement of the lever then increases the gap between the two members 280, 281. For example, the lever is attached to a cam which when rotated forces the two members 280, 281 apart.

Figure 5:
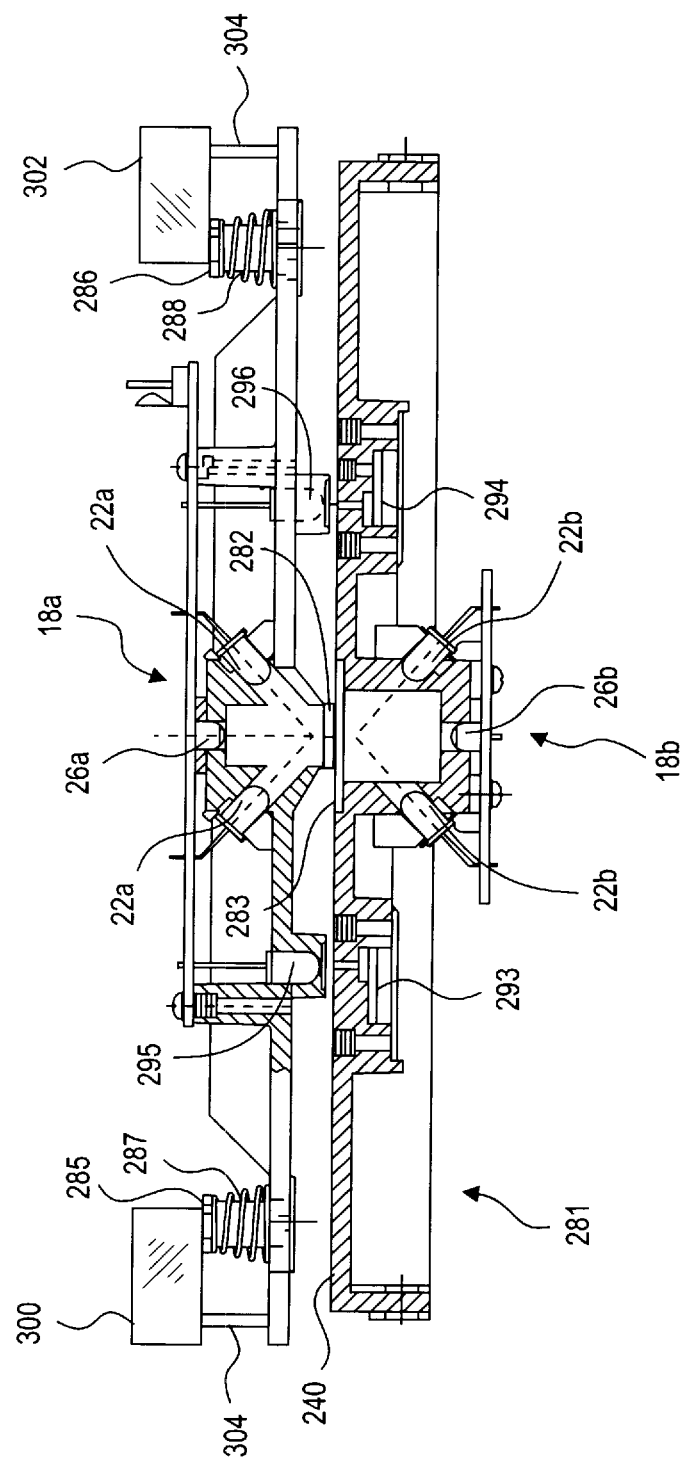
FIG. 5 is a section view of the sensing device incorporating solenoids for separating the two members of the sensing device.

In yet a further alternative, the upper member 280 could be automatically converted between the operational position and the retracted position by use of a pair of solenoids 300, 302 as shown in FIG. 5. The solenoids 300, 302 are affixed onto the rigid frame near the posts 285, 286. Each solenoid 300, 302 has a displacing member 304 which attaches to the upper member 280. When energized, the displacing member 304 of the solenoids 300, 302 act against the force of the springs 286, 287 and move the upper member 280 from the operational position to the retracted position. Although the solenoids 300, 302 are shown attached to the upper member 280, they can also be attached to the lower member 281. In such an embodiment, the solenoids 300, 302 then push the upper member 280 away from the lower member 281 against the force of the springs 287, 288.

Figure 6:
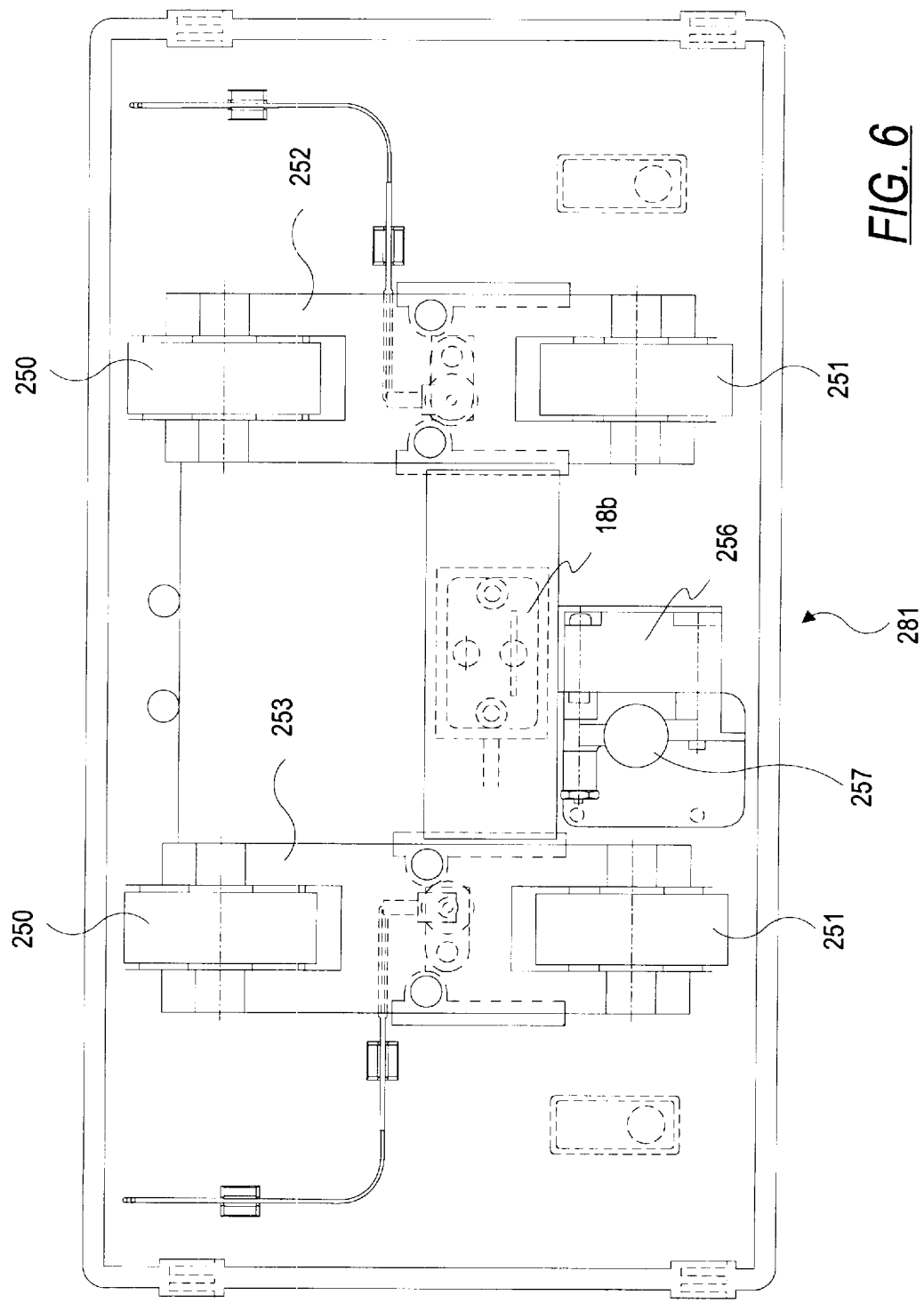
FIG. 6 is an enlarged bottom plan view of the lower member of the scanning device of FIGS. 3 or 5 and the passive transport rolls mounted on the lower member.
Figure 7:
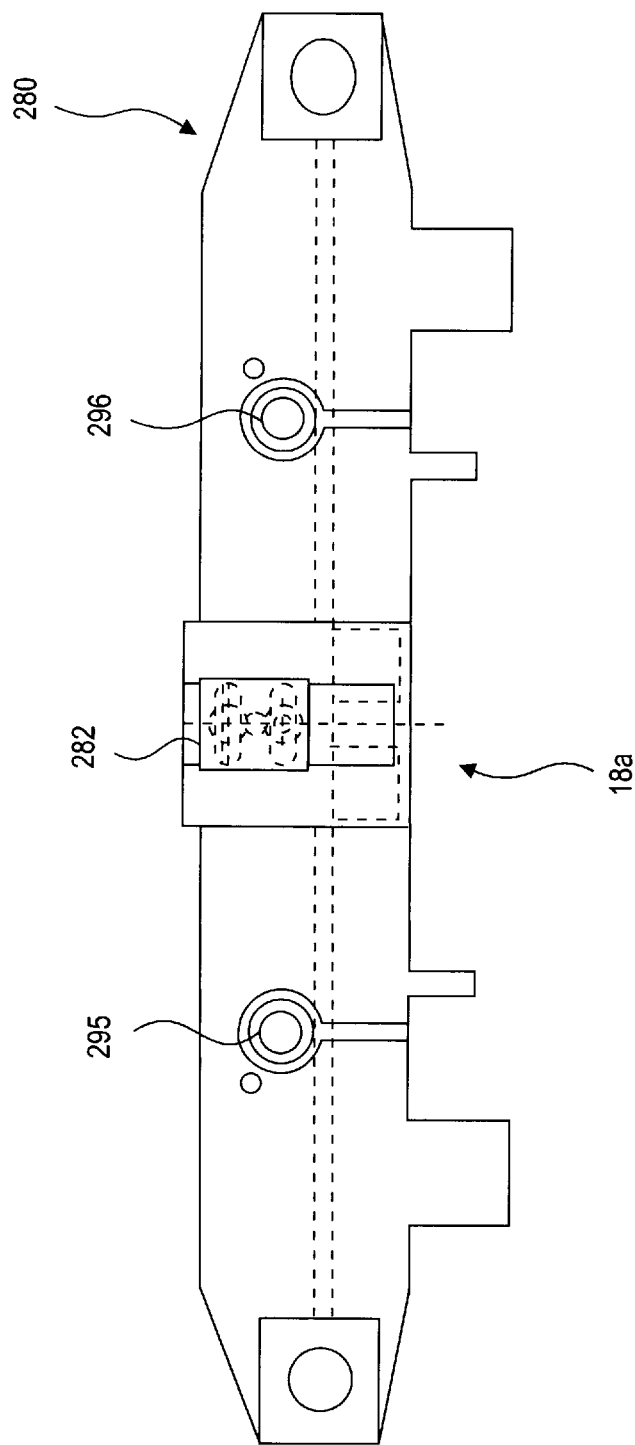
FIG. 7 is a bottom plan view of the upper member in the scanning device of FIGS. 3 or 5 which includes the upper scanhead.

FIG. 6 shows a bottom plan view of the lower member 281 of the scanning device and the passive transport rolls 250, 251. FIG. 7 illustrates a bottom plan view of the upper member 280 including the upper scanhead 18. Both figures are applicable to the scanning device illustrated in FIGS. 3 or 5.

Figure 8:
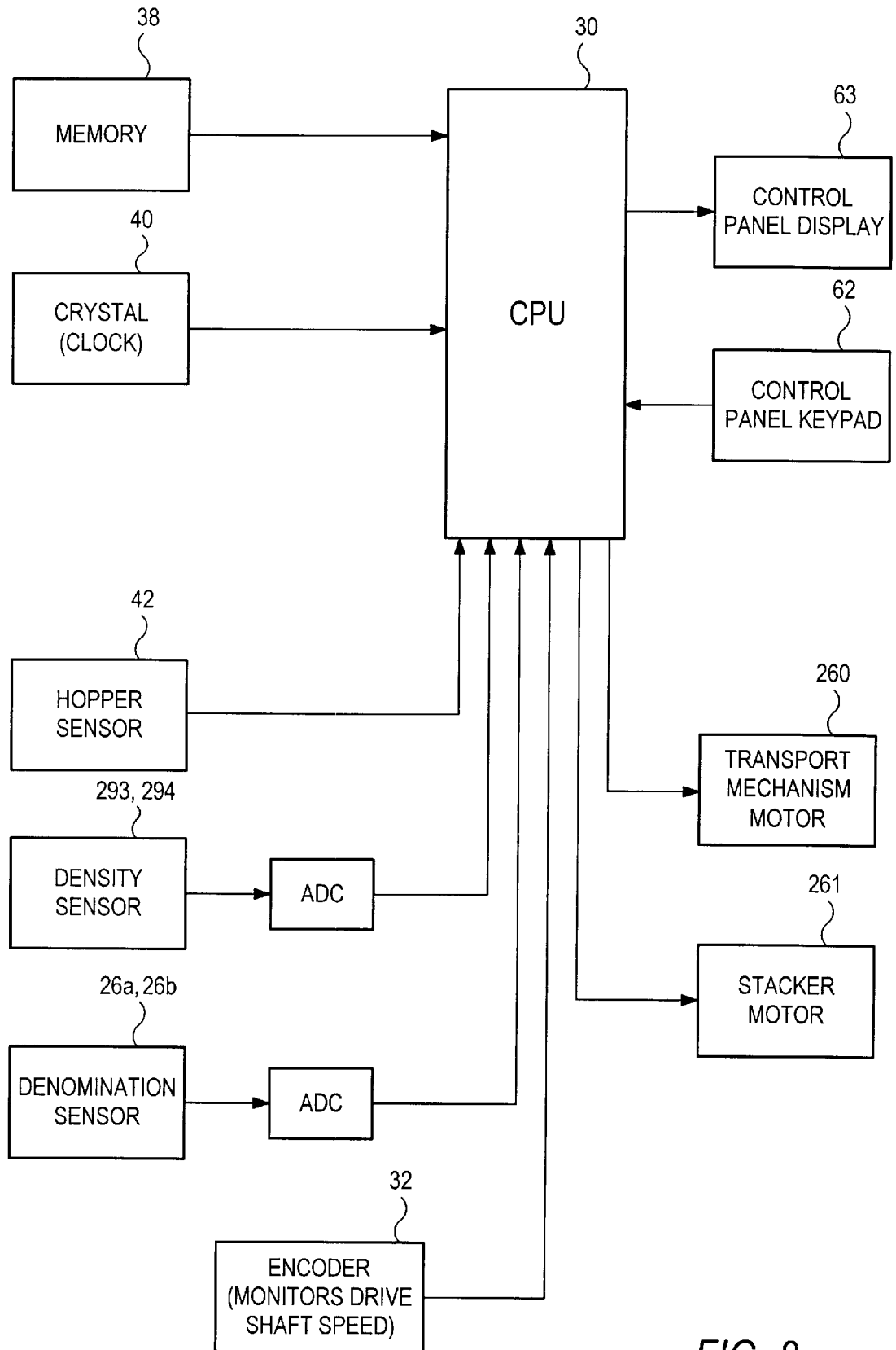
FIG. 8 is a block diagram illustrating the components used by the jam detection and clearing mechanism.

As shown in FIG. 8, the CPU 30 of the machine 10 is coupled to various components within the jam detection and clearing mechanism. The CPU 30 is coupled to a memory device 38 and receives inputs from a crystal 40 which serves as the time base for the CPU 30. The CPU 30 also receives operator input signals from the keypad 62 on the control panel 61 and provides the user with information via the display 63 on the control panel 61. The CPU 30 also controls the operation of both the stacker motor 261 and the transport mechanism motor 260.

With respect to the detection of a jam which is described in detail below in reference to FIGS. 10a–10c, the CPU 30 processes the output of the denomination sensors 26a, 26b and the density sensors 293, 294. The outputs of both of these sensors are converted to digital signals by standard ADCs before being received by the CPU 30. Also, the CPU 30 monitors the velocity of the drive shaft or the transport mechanism via the encoder 32 which is described in detail below.

Additionally, the CPU 30 monitors a hopper sensor 42 placed adjacent the removable hopper 209 which indicates whether the hopper 209 is installed or detached from the machine 10.

Figure 9:
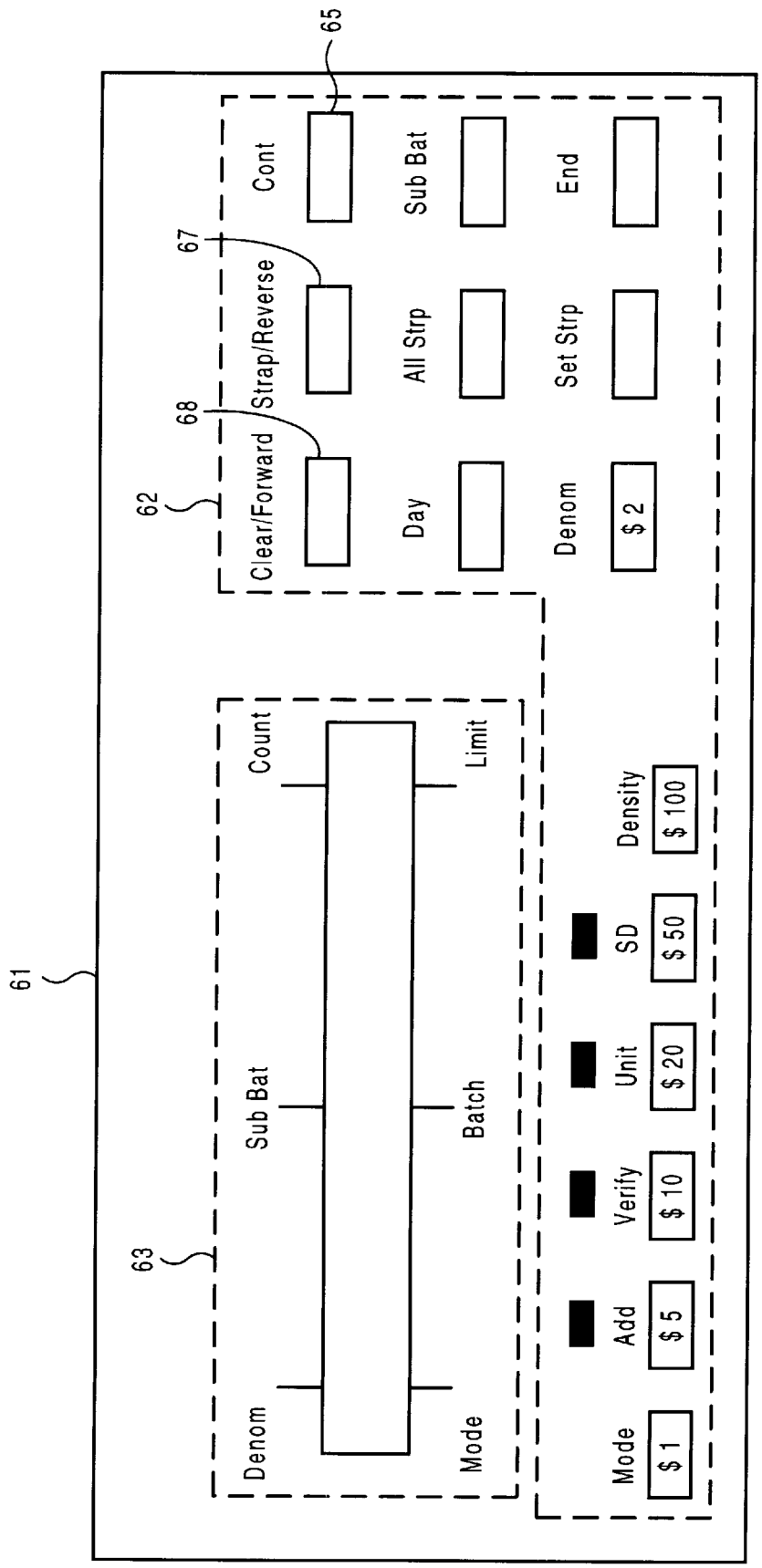
FIG. 9 is an enlarged plan view of the control panel and the display panel of the machine in FIG. 1.

Once the lower member 281 and the upper member 280 are separated, the jammed currency bill must still be removed from the transport path. This is accomplished by operating the bill transport mechanism in a reverse or forward motion to clear the jammed bill. As shown in FIG. 9, the control panel 61 (also shown in FIG. 1) includes the display 63 as well as the keypad 62 having a plurality of keys actuated by the operator to perform various functions. A reverse key 67 and a forward key 68 on the keypad 62 send a reverse signal and a forward signal, respectively, to the CPU 30 which instructs the transport mechanism to operate in the reverse or forward mode. Thus, when the operator actuates the reverse key 67, the CPU 30 receives a reverse signal and instructs the transport motor 260 to rotate in a reverse direction. The jammed currency bill then moves back through the guideway 211 and can be accessed at the opening near wall 205 adjacent the nips formed by roll 223 and stripping wheels 233, 234 as shown in FIG. 2. If the jammed currency bill is not accessible after actuation of the reverse key 67, then the operator can activate the forward key 68 to attempt to move the jammed bill forward. This will result in the currency bill being accessible at the output receptacle 217. No data is processed at this point and the jammed bill must be returned to the stack. The operator then returns the upper member 280 to the operational position by utilizing the handles 297 or activating a key on the control panel 261 if the separation of the members 280, 281, occurs via solenoids.

Alternatively, the machine can include a manual turn-knob 289 (see FIG. 2) which is connected to the driver shaft 224 of the drive roll 223 instead of utilizing the reverse key 67 and the forward key 68. After the members 280, 281 are separated, the operator then manually turns the knob in a forward or reverse direction to transport the jammed currency bill along the transport path and clear the jam.

Figure 10A:
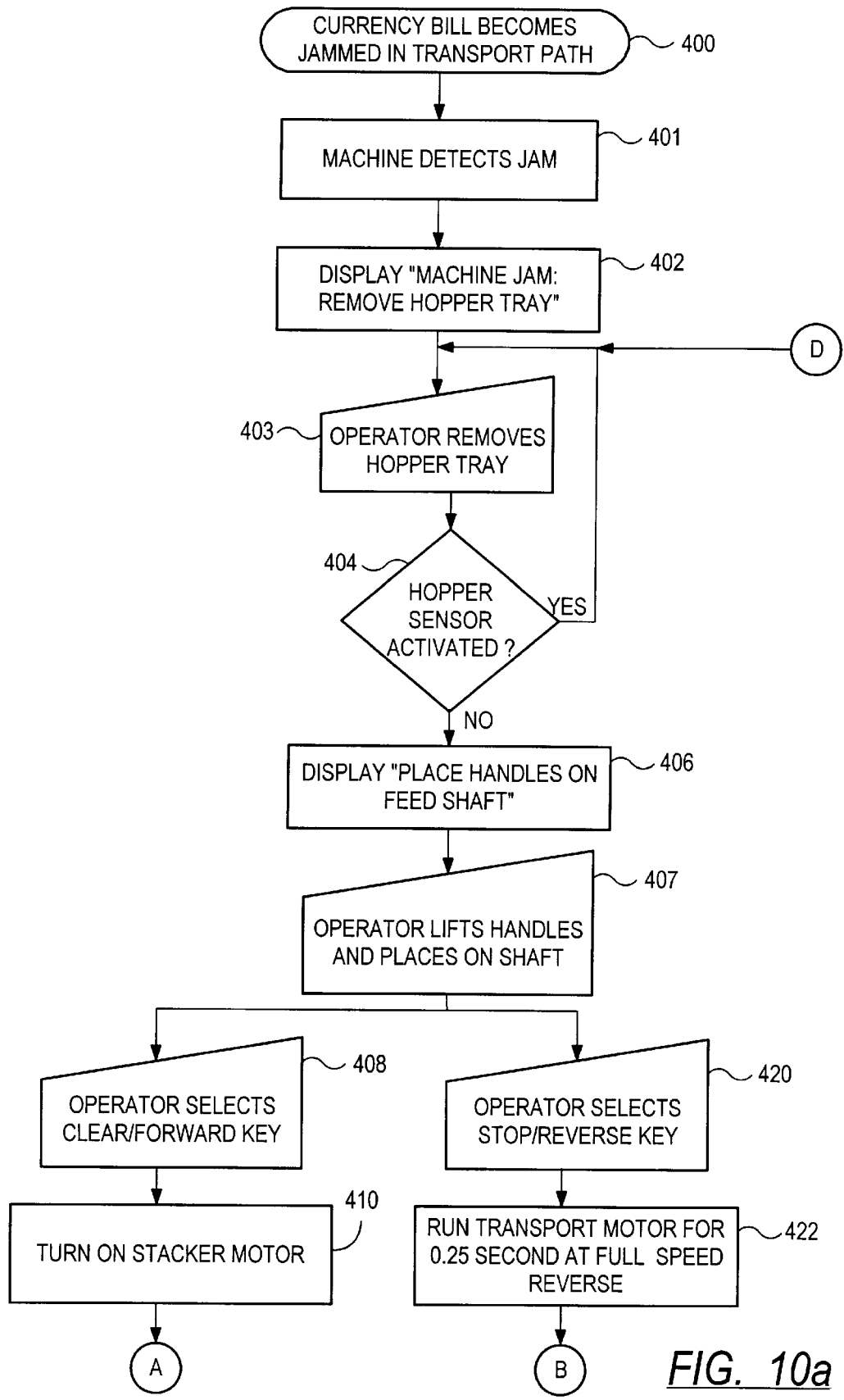
FIGS. 10a–10c are flow charts illustrating the sequential procedure followed in clearing a jammed currency bill according to an embodiment of the present invention.
Figure 10B:
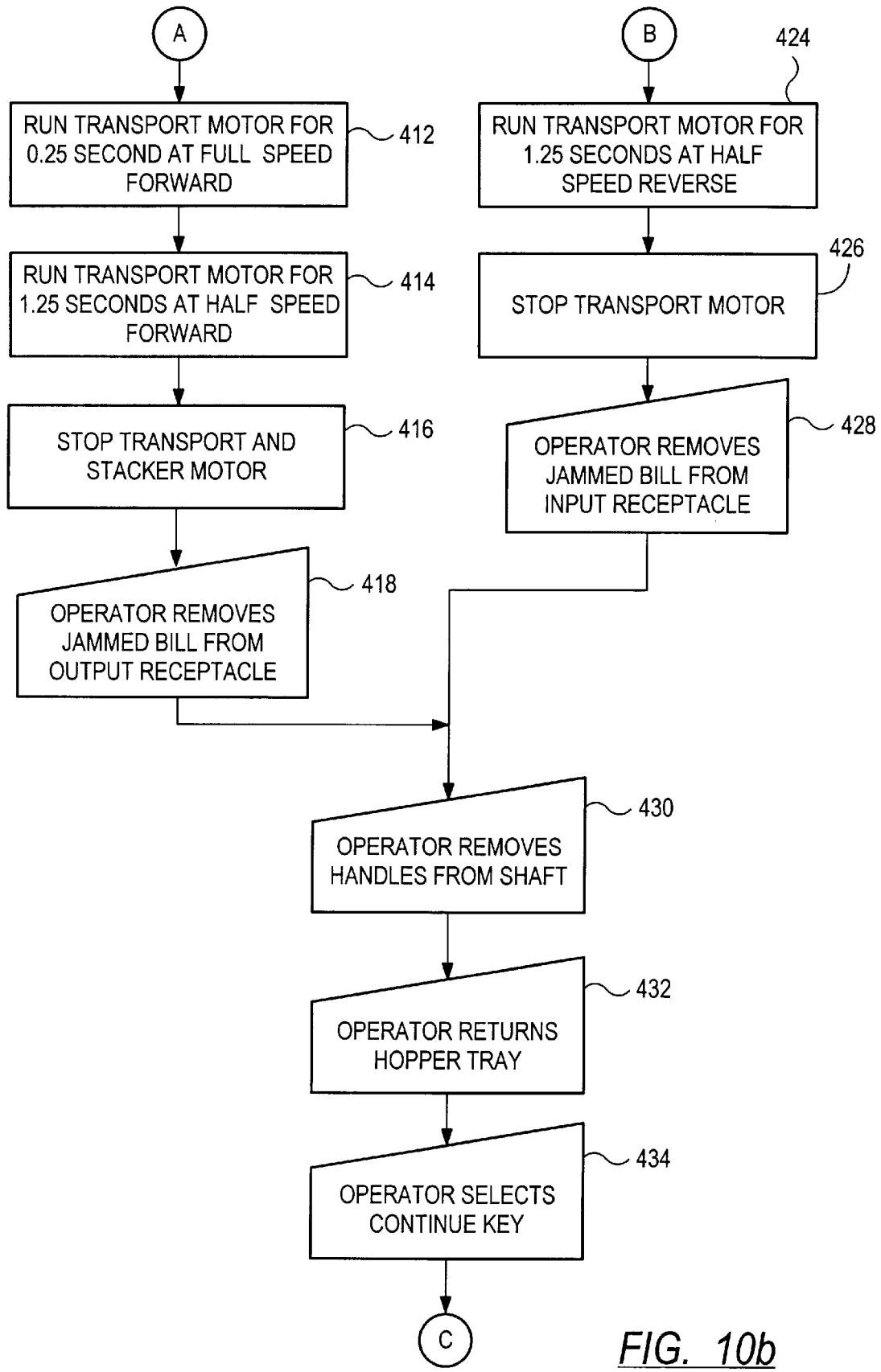
Figure 10C:
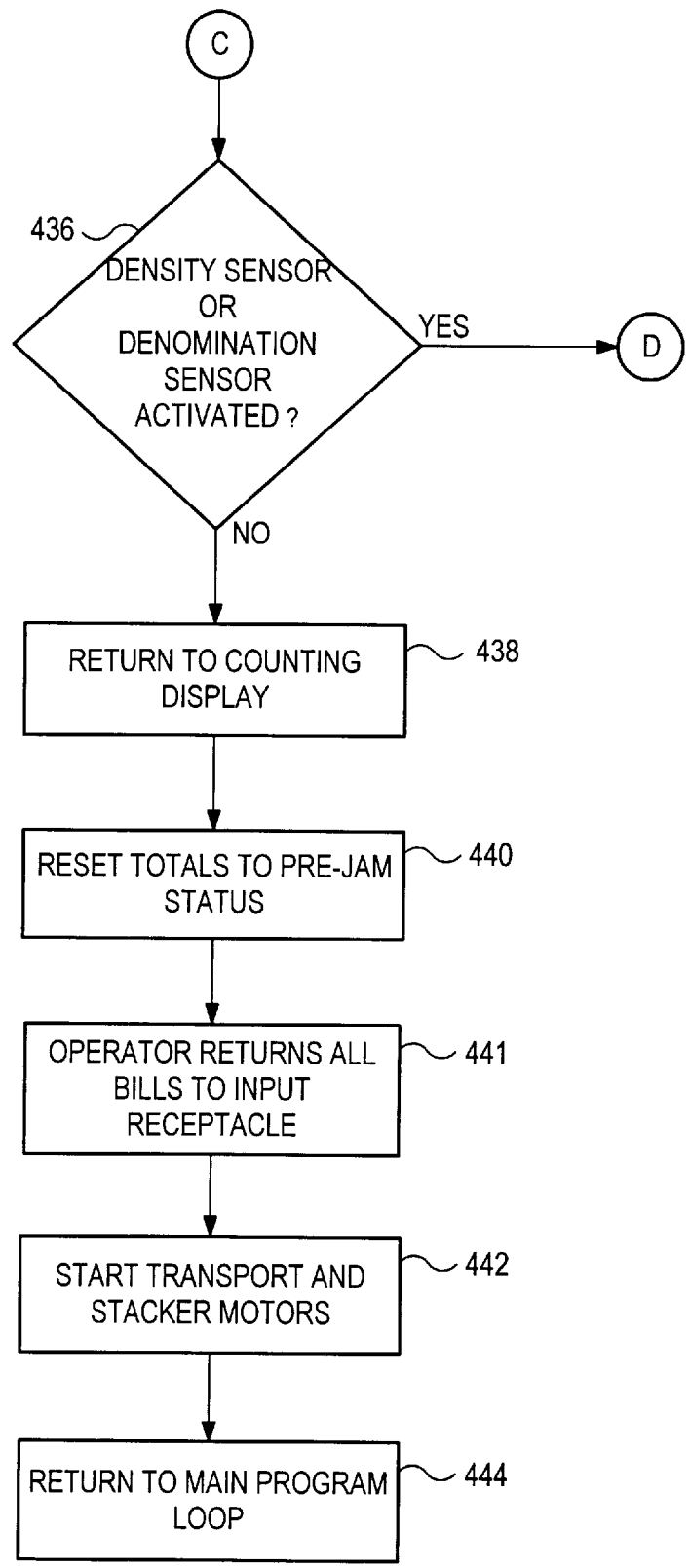

FIGS. 10a–10c are flow charts which illustrate the process in which a jammed bill is detected and the resultant actions by the operator and the machine. After a bill becomes jammed along the transport path (step 400), the machine detects the jam (step 401). The machine accomplishes this task in one of three ways. First, if the time required for a currency bill to pass by one of the density photodetector sensors 293, 294 exceeds a threshold limit, then a jam has likely occurred. Second, if the time required for a bill to pass through the currency denomination photodetectors 26a and 26b exceeds a threshold limit, then a jam is probable. Generally, these upper threshold limits are approximately 0.25 second (the normal time required for a bill to pass by one of these sensors is approximately 0.025 second). The third method by which a jam can be detected is by monitoring the encoder 32 which indicates the shaft speed of the transport motor 260 powering the transport mechanism. More specifically, the optical encoder 32 is linked to the output shaft of the transport motor 260 which drives the transport mechanism that moves the bill along the transport path. The optical encoder 32 sends signals to the CPU 30 corresponding to successive increments of angular displacement of the drive shaft of the transport motor 260. Thus, if the signals received by the CPU 30 from the encoder 32 drop below a threshold limit in a selected time period, then the shaft speed of the transport motor 260 has been reduced by the occurrence of the jam which increases the load on the transport motor 260

Once the CPU 30 receives a jam signal from any of these three jam detection mechanisms, the transport motor 260 is disabled by the CPU 30. The CPU 30 then sends a signal to the display 63 on the control panel 61 which informs the operator that a jam has been detected (step 402). To access and lift the handles 297 to relieve the pressure applied to the jammed bill by the transport mechanism, the operator must remove the hopper tray 209 (step 403).

The hopper sensor 42 (in FIG. 8) is positioned adjacent the hopper tray 209 and detects whether the hopper tray 209 is in position. If the CPU 30 determines the hopper tray 209 has been removed (step 404), then the display 63 on the control panel 61 instructs the operator to lift the handles 297 and position their engagement surfaces 299a over the drive shaft 221 (step 406). After lifting the handles 297 and attaching them to the feed shaft (step 407), the upper member 280 and lower member 281 are now in the retracted position, and the operator can begin the process of removing the jammed bill from the transport path.

If an automatic separation technique is utilized, such the solenoids 300, 302 described above in connection with FIG. 5, then steps 403–407 are obviated.

The operator uses the keys on the control panel 61 to activate the transport mechanism and remove the jammed bill. If the operator chooses the forward key 267 (step 408), the machines starts the stacker motor 216 since the bill will be expelled near the output receptacle by the stacker wheels 212, 213 (step 410). The transport motor 260 driving the transport mechanism is then run at full forward speed for 0.25 second (step 412) to remove the jammed bill and then for an additional 1.25 seconds at half forward speed (step 414). The stacker motor 216 and the transport motor 260 are then stopped (step 416) and the operator removes the formerly jammed bill from the output receptacle (step 418).

The operator can also choose the reverse key 267 on the control panel 61 when attempting to remove a jammed bill (step 420). Because the reverse mode will not result in the bill being expelled from the output receptacle, there is no need to activate the stacker motor 216. The transport motor 260 driving the transport mechanism is then run at full reverse speed for 0.25 second (step 422) and then at half speed reverse for an additional 1.25 seconds to remove the jammed bill to the input receptacle. The transport motor 260 is then stopped (step 426) and the operator removes the formerly jammed bill from the input receptacle (step 428). The operator can continuously alternate between the reverse key 67 and the forward key 68 until the jammed bill is successfully removed.

Once the formerly jammed bill is retrieved, the operator then grasps the handles 297 and returns the upper member 280 to its operational position (step 430). The machine may also have a sensor which detects whether the upper member 280 is in the retracted position. For example, a switch which is activated only when the upper member 280 is in the retracted position may be employed. Alternatively, the amount of light received by the density photodetectors 293, 294 depends on their distance from the light source. Thus, the retracted position can be distinguished from the operational position by the density photodetectors 293, 294 assuming the jammed bill is cleared. Thus, the CPU 30 can then prompt the operator to perform the next steps in the procedure based on whether the upper member 280 is in the operational or retracted position.

The operator returns the hopper tray 209 to its normal position (step 432) and selects a continue key 65 (step 434) on the control panel 61 (shown in FIG. 9). The machine then checks the density photodetectors 293, 294 and the currency denomination photodetectors 26a and 26b to ensure that the jam has been completely cleared (step 436). If the machine still detects the presence of a jammed bill, then the machine performs the entire clearance process again.

If no bill is detected, then the display 63 returns to its normal counting mode (step 438) and all totals are reset to the recorded amount prior to the processing of the initial bill in the stack of bills which produced the jam (step 440). The operator then gathers all bills in the stack which produced the jam from the output receptacle and the input receptacle including the jammed bills, and returns them as a stack to the input receptacle to be recounted and rediscriminated (step 441). The stacker motor 216 and the transport motor 260 are then started (step 442) and the CPU 30 begins to run the main programming loop (step 444). Currency bills in the input receptacle will now be transported by the transport mechanism and undergo the scanning process.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A currency counting and discrimination machine for receiving currency bills in an input receptacle, rapidly counting and discriminating said currency bills, and then discharging said currency bills to an output receptacle, comprising:

a sensing device for scanning and counting said currency bills;

a controller coupled to said sensing device;

a transport mechanism engaging and transporting said currency bills, one at a time, along a transport path from said input receptacle to said output receptacle, a segment of said transport path being adjacent to said sensing device;

means for detecting when a currency bill is jammed along said transport path, said detecting means being coupled to said controller and producing a jam signal upon detection of a jammed currency bill;

means coupled to said controller for interrupting the operation of said transport mechanism in response to said jam signal from said detecting means; and means for adjusting a portion of said transport mechanism to a retracted position wherein additional space is provided for said jammed currency bill in said transport mechanism, said jammed currency bill remaining in substantial engagement with said transport mechanism while said transport mechanism is in said retracted position so that said transport mechanism can still move said jammed currency bill toward one of said two receptacles.

2. The currency counting and discrimination machine of claim 1, wherein said transport mechanism includes two members on which said sensing device is mounted, said members defining a gap therebetween for guiding said currency bills past said sensing device along said transport path.

3. The currency counting and discrimination machine of claim 2, wherein one of said two members remains stationary and the other of said two members is adjustable by said adjusting means.

4. The currency counting and discrimination machine of claim 2, further including at least one spring for biasing at least one of said two members into an operational position, said at least one spring being connected to a fixed element within said machine.

5. The currency counting and discrimination machine of claim 1, wherein said adjusting means includes at least one handle attached to said portion of said transport mechanism.

6. The currency counting and discrimination machine of claim 5, wherein said handle includes an attachment portion, said attachment portion engaging a fixed component within said machine after said portion of said transport mechanism is placed in said retracted position.

7. The currency counting and discrimination machine of claim 1, further comprising an operator control panel having a forward key and a reverse key coupled to said controller for producing a forward signal and a reverse signal, respectively, said controller instructing said transport mechanism to operate in a forward direction upon receipt of said forward signal and instructing said transport mechanism to operate in a reverse direction upon receipt of said reverse signal.

8. The currency counting and discrimination machine of claim 1, wherein said adjusting means includes at least one solenoid coupled to said controller, said solenoid displacing said portion of said transport mechanism from an operational position to said retracted position when energized.

9. The currency counting and discrimination machine of claim 1, wherein said detecting means are positioned at multiple locations along said transport path.

10. The currency counting and discrimination machine of claim 1, wherein said transport mechanism includes at least one shaft, said detecting means includes a means for monitoring the rotation of said at least one shaft.

11. A sensing mechanism for a currency counting and discrimination machine, said machine for receiving currency bills in an input receptacle, rapidly counting and discriminating said currency bills, and then discharging said currency bills to an output receptacle, said machine including a transport mechanism for transporting said currency bills from said input receptacle to said output receptacle along a transport path, said sensing mechanism being adjacent said transport path, said sensing mechanism comprising:

a sensing device for counting and discriminating said currency bills;

a first member on which a portion of said sensing device is mounted and forming a portion of said transport mechanism; and means for adjusting said first member from an operational position to a retracted position to relieve pressure exerted on a jammed currency bill without substantially affecting said portion of said transport mechanism such that said transport mechanism can still act on said jammed currency bill.

12. The sensing mechanism of claim 11, wherein said adjusting means includes a handle attached to said first member for adjusting said first member.

13. The sensing mechanism of claim 12, wherein said handle includes an attachment portion, said attachment portion engaging a fixed component within said machine after said first member is placed in said retracted position.

14. The sensing mechanism of claim 11, wherein said adjusting means includes a solenoid for displacing said first member from said operational position to said retracted position when energized.

15. The sensing mechanism of claim 11, wherein said transport mechanism further includes a second member, said first member and said second member defining a gap therebetween in said operational position for guiding said currency bills past said sensing device along said transport path, said second member being stationary.

16. The sensing mechanism of claim 15, wherein a second portion of said sensing device is mounted on said second member.

17. The sensing mechanism of claim 15, further including at least one spring for biasing said first member into said operational position, said at least one spring being connected to a fixed element within said machine.

18. The sensing mechanism of claim 17, wherein said adjusting means includes a handle attached to said first member, said handle including an attachment portion for engaging a fixed component within said machine after said portion of said transport mechanism is placed in said retracted position.

19. A method for clearing a jammed currency bill from a transport path in a currency machine, said machine receiving currency bills in an input receptacle, rapidly counting said currency bills, and then discharging said currency bills to an output receptacle, said machine including a transport mechanism for transporting said currency bills from said input receptacle to said output receptacle along said transport path, said machine further including a sensing device adjacent said transport path, said method comprising the steps of:

detecting said jammed currency bill in said transport path;

interrupting the operation of said transport mechanism;

adjusting a portion of said transport mechanism from an operational position to a retracted position to relieve pressure on said jammed currency bill;

activating said transport mechanism while said transport mechanism is in said retracted position to dislodge and move said jammed currency bill toward one of said input and output receptacles; and returning said portion of said transport mechanism to said operational position.

20. The method of claim 19, wherein said step of adjusting said portion of said transport mechanism includes the steps of:

grasping a handle attached to said portion of said transport mechanism;

moving said handle to adjust said portion of said transport mechanism to said retracted position; and attaching an attachment portion of said handle to a fixed element in said machine.

21. The method of claim 19, wherein said step of adjusting said portion of said transport mechanism includes the step of energizing a solenoid to move said portion of said transport mechanism to said retracted position, and said step of returning said portion of said transport mechanism includes the step of deenergizing said solenoid.

22. A currency counting machine for receiving currency bills in an input receptacle, rapidly counting said currency bills, and then discharging said currency bills to an output receptacle, comprising:

a sensing device for counting said currency bills;

a controller coupled to said sensing device;

a transport mechanism engaging and transporting said currency bills, one at a time, along a transport path from said input receptacle to said output receptacle, a segment of said transport path being adjacent said sensing device;

means for detecting when a currency bill is jammed along said transport path, said detecting means being coupled to said controller and producing a jam signal upon detection of a jammed currency bill;

means coupled to said controller for interrupting the operation of said transport mechanism in response to said jam signal from said detecting means;

means for adjusting a portion of said transport mechanism to relieve pressure exerted on said jammed currency bill by said transport menchanism; and means for jogging said transport mechanism to move said jammed bill toward one of said input and output receptacles after relieving said pressure via said adjusting means.

23. The currency machine of claim 22, wherein said jogging means includes a device for manually driving said transport mechanism.

24. The currency machine of claim 22, wherein said jogging means includes forward and reverse keys which, when actuated by an operator of said machine, drive said transport mechanism.

25. A currency machine for receiving currency bills in an input receptacle, rapidly counting said currency bills, and then discharging said currency bills to an output receptacle, comprising:

a sensing device for counting said currency bills;

a controller coupled to said sensing device;

a transport mechanism engaging and transporting said currency bills, one at a time, along a transport path from said input receptacle to said output receptacle, a segment of said transport path being adjacent to said sensing device;

means for detecting when a currency bill is jammed along said transport path, said detecting means being coupled to said controller and producing a jam signal upon detection of a jammed currency bill;

means coupled to said controller for interrupting the operation of said transport mechanism in response to said jam signal from said detecting means; and means for adjusting a portion of said transport mechanism to release said jammed currency bill in said transport mechanism, said adjusting means including at least one handle attached to said portion of said transport mechanism, said handle including an attachment portion for engaging a fixed component within said machine after said portion of said transport mechanism is placed in a retracted position.

26. The currency machine of claim 25, wherein said transport mechanism includes two members on which said sensing device is mounted, said members defining a gap therebetween for guiding said currency bills past said sensing device along said transport path.

27. The currency machine of claim 26, wherein one of said two members remains stationary and the other of said two members is adjustable by said adjusting means.

28. The currency machine of claim 26, further including at least one spring for biasing at least one of said two members into an operational position, said at least one spring being connected to a fixed element within said machine.

29. A sensing mechanism for a currency machine that receives currency bills in an input receptacle, rapidly counts said currency bills, and then discharges said currency bills to an output receptacle, said machine including a transport mechanism for transporting said currency bills from said input receptacle to said output receptacle along a transport path, said sensing mechanism being adjacent to said transport path, said sensing mechanism comprising:

a sensing device for counting said currency bills;

first member on which a portion of said sensing device is mounted and forming a portion of said transport mechanism; and means for adjusting said first member from an operational position to a retracted position to relieve pressure exerted on a jammed currency bill, said adjusting means including a handle attached to said first member for adjusting said first member, said handle including an attachment portion for engaging a fixed component within said machine after said first member is placed in said retracted position.

30. The sensing mechanism of claim 29, further including at least one spring for biasing said first member into said operational position.

* * * * *

UNITED STATES PATENT AND TRADEMARK OFFICE
CERTIFICATE OF CORRECTION

PATENT NO.    :   5,806,650
DATED         :   September 15, 1998
INVENTOR(S)   :   Douglas U. Mennie et al.

It is certified that error appears in the above-identified patent and that said Letters Patent is hereby corrected as shown below:

Claim 22, column 12, line 5, delete "counting";
Claim 29, column 14, line 2, insert "a" before "first".

Signed and Sealed this

Twenty-third Day of February, 1999

Attest:

Q. TODD DICKINSON

Attesting Officer

Acting Commissioner of Patents and Trademarks